(12) United States Patent
Berg et al.

(10) Patent No.: US 11,184,366 B1
(45) Date of Patent: *Nov. 23, 2021

(54) SERVICE AUTHORIZATION FOR IOT DEVICES OPERATING LOCALLY

(71) Applicant: Alarm.com Incorporated, Tysons, VA (US)

(72) Inventors: Benjamin Asher Berg, Washington, DC (US); Christopher Silverman, Alexandria, VA (US)

(73) Assignee: Alarm.com Incorporated, Tysons, VA (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/787,094

(22) Filed: Feb. 11, 2020

Related U.S. Application Data (63) Continuation of application No. 15/857,071, filed on Dec. 28, 2017, now Pat. No. 10,581,872.

(60) Provisional application No. 62/440,196, filed on Dec. 29, 2016.

(51) Int. Cl.
| | |
|---|---|
| *H04L 29/06* | (2006.01) |
| *H04L 9/32* | (2006.01) |
| *G06F 21/00* | (2013.01) |
| *H04W 12/08* | (2021.01) |
| *H04W 12/04* | (2021.01) |

(52) U.S. Cl.
CPC .......... *H04L 63/108* (2013.01); *H04L 9/3242* (2013.01); *H04L 63/061* (2013.01); *H04L 63/068* (2013.01); *H04W 12/04* (2013.01); *H04W 12/08* (2013.01)

(58) Field of Classification Search
CPC . H04L 63/10; H04L 63/08; H04L 9/32; G06F 21/00

See application file for complete search history.

(56) References Cited

U.S. PATENT DOCUMENTS

| | | | |
|---|---|---|---|
| 2016/0149869 A1* | 5/2016 | Selander | H04L 63/0428 713/176 |
| 2016/0156604 A1* | 6/2016 | Oh | H04W 12/084 726/4 |

FOREIGN PATENT DOCUMENTS

| | | | | |
|---|---|---|---|---|
| WO | WO2017053048 | | 3/2017 | |
| WO | WO-2017053048 A1 * | | 3/2017 | H04L 67/04 |

* cited by examiner

*Primary Examiner* — Izunna Okeke
(74) *Attorney, Agent, or Firm* — Fish & Richardson P.C.

(57) ABSTRACT

Systems, devices, and techniques for service authorization are described. A described device includes a transceiver to communicate with an authorization server, and a processor. The processor can set an authorization timer for a first time period based on obtaining an authorization from the authorization server, and activate device features for a duration of the first time period. The processor can receive from the authorization server an authorization message that includes an authorization key hash based on a shared secret key and a server timestamp, determine a local key hash based on the shared secret key and a local timestamp, set the authorization timer for a second time period based on the authorization key hash matching the local key hash, and maintain an activation of the features for a duration of the second time period.

19 Claims, 8 Drawing Sheets

SERVICE AUTHORIZATION FOR IOT DEVICES OPERATING LOCALLY

CROSS REFERENCE TO RELATED APPLICATIONS

This disclosure is a continuation of and claims the benefit of the priority of U.S. application Ser. No. 15/857,071, filed Dec. 28, 2017, which claims the benefit of U.S. Provisional Application Ser. No. 62/440,196, entitled "Service Authorization for IoT Devices Operating Locally" and filed Dec. 29, 2016. The above-identified applications are incorporated by reference in their entirety.

TECHNICAL FIELD

This disclosure relates to service authorization technology.

BACKGROUND

The Internet-of-Things (IoT) concept includes the widespread deployment of Internet enabled devices. Examples of various IoT applications includes home or office security and automation, monitoring of appliances, e-commerce, and sensor networks to collect data. In some implementations, IoT devices can communicate with a server via a wide area network (WAN) which can be based on a wireless technology such as Long-Term Evolution (LTE), Code Division Multiple Access (CDMA), or Global System for Mobile communication (GSM). In some implementations, an IoT device can communicate with a server via a wireless local area network (WLAN) such as an IEEE 802.11 based Wi-Fi network.

SUMMARY

Techniques and systems are described for authorizing IoT devices via one or more network connections. A described technique includes operating an IoT device to send an authorization message to a cloud server and receive an authorization response message. The technique can include operating the IoT device to perform periodic reauthorizations. The cloud server can check whether the IoT device is included in a customer's service plan agreement before authorizing the device to operate. Based on a successful authorization, the IoT can be authorized to operate in a full-functionality mode for a predetermined amount of time. Before the end of the predetermined amount of time, either the IoT device or the cloud server can initiate a re-authorization process. In some scenarios, the IoT device may be installed in an area with no or minimal network connectivity. In such scenarios, an intermediary device can relay authorization information between the server and the IoT device.

According to an aspect of the present disclosure, an IoT device can include a transceiver configured to communicate with an authorization server; a memory configured to store information including a shared secret key established between the device and the authorization server; and a processor coupled with the transceiver and the memory. The processor can be configured to set an authorization timer for a first predetermined time period based on obtaining an authorization from the authorization server, and activate one or more features of the device for a duration of the first predetermined time period. The processor can be configured to receive an authorization message from the authorization server, the authorization message including an authorization key hash that is based on the shared secret key and a server timestamp, determine a local key hash based on the shared secret key and a local timestamp, set the authorization timer for a second predetermined time period based on the authorization key hash matching the local key hash, and maintain an activation of the one or more features of the device for a duration of the second predetermined time period.

This and other implementations can include one or more of the following features. In some implementations, the processor is configured to send an authorization request to the authorization server to renew the authorization before an end of the first predetermined time period, the authorization message being sent by the authorization server in response to the authorization request. In some implementations, the processor is configured to use the transceiver to establish a short-range connection with an intermediary device, and receive the authorization message from the authorization server via the intermediary device over the short-range connection. In some implementations, the processor is configured to not renew the authorization based on a determination that the authorization key hash does not match the local key hash. In some implementations, the processor is configured to determine whether the authorization timer has expired and to deactivate the one or more features of the device based on an expiration of the authorization timer. In some implementations, the processor is configured to determine whether the authorization timer has expired and to place the one or more features of the device in a degraded functionality mode based on an expiration of the authorization timer. In some implementations, the processor is configured to exchange information with the authorization server to establish the shared secret key.

According to another aspect of the present disclosure, a system can include a network interface configured to communicate with a device; a memory configured to store information including a shared secret key established between the device and the system; and a processor coupled with the network interface and the memory. The processor can be configured to receive an authorization request from the device, determine whether the device is authorized to operate under a service plan, determine an authorization key hash that is based on the shared secret key and a server timestamp if the device is authorized to operate under the service plan, and send a response that comprises the authorization key hash if the device is authorized to operate under the service plan.

This and other implementations can include one or more of the following features. In some implementations, the processor is configured to receive an authorization status message from the device, and update an expected de-authorization time for the device in response to the authorization status message. The authorization key hash can be a first authorization key hash. The server timestamp can be a first server timestamp. In some implementations, the processor is configured to determine that the expected de-authorization time is within a predetermined time period from a current time, determine whether the device remains authorized to operate under the service plan, determine a second authorization key hash that is based on the shared secret key and a second server timestamp if the device remains authorized to operate under the service plan, and send an authorization message that comprises the second authorization key hash if the device remains authorized to operate under the service plan.

The device can be a remote device. In some implementations, the processor is configured to determine whether there is an intermediary device associated with the remote device. In some implementations, the processor is configured to send the authorization message to the intermediary device, the intermediary device being configured to establish a short-range connection with the remote device, and forward the authorization message to the remote device via the short-range connection. The authorization status message can be a first authorization status message. In some implementations, the processor is configured to receive a second authorization status message from the remote device via the intermediary device, and update the expected de-authorization time for the remote device in response to the second authorization status message, the intermediary device being configured to receive the second authorization status message from the remote device via the short-range connection in response to the authorization message, and forward the second authorization status message.

In some implementations, the processor is configured to send a push notification to an intermediary device if the expected de-authorization time is within a predetermined time period from a current time. The push notification can be configured to cause the intermediary device to display a notification stating that the intermediary device is required to establish a connection with the remote device to re-authorize the remote device. In some implementations, the processor is configured to exchange information with the device to establish the shared secret key.

According to another aspect of the present disclosure, a technique can include receiving, at an authorization server, an authorization request from a device; determining whether the device is authorized to operate under a service plan; determining an authorization key hash responsive to the device being authorized to operate under the service plan, the authorization key hash being based on a shared secret key and a server timestamp, the shared secret key being established between the device and the authorization server; and sending a response to the device responsive to the device being authorized to operate under the service plan, the response including the authorization key hash.

This and other implementations can include one or more of the following features. Implementations can include receiving an authorization status message from the device, and updating an expected de-authorization time for the device in response to the authorization status message. The authorization key hash can be a first authorization key hash. The server timestamp can be a first server timestamp. Implementations can include determining that the expected de-authorization time is within a predetermined time period from a current time, determining whether the device remains authorized to operate under the service plan, determining a second authorization key hash that is based on the shared secret key and a second server timestamp if the device remains authorized to operate under the service plan, and sending an authorization message that includes the second authorization key hash if the device remains authorized to operate under the service plan. Implementations can include operating the device as a remote device, determining whether there is an intermediary device associated with the remote device, and sending the authorization message to the intermediary device. The intermediary device can be configured to establish a short-range connection with the remote device, and forward the authorization message to the remote device via the short-range connection.

Implementations can include receiving an additional authorization status message from the remote device via the intermediary device, the additional authorization status message being sent in response to the authorization message; and updating the expected de-authorization time for the remote device in response to the additional authorization status message. Implementations can include operating the device as a remote device, and sending a push notification to an intermediary device. The push notification can be configured to cause the intermediary device to display a notification stating that the intermediary device is required to establish a connection with the remote device to re-authorize the remote device.

Particular configurations of the technology described in this disclosure can be implemented so as to realize one or more of the following potential advantages. The use of a timestamp in a key hash can prevent replay attacks, e.g., re-sending a previous authorization message to try to re-authorize the device without permission. A disclosed periodic reauthorization process can enable a subscription based user model. Moreover, a disclosed periodic reauthorization process can enable a device to operate under a subscription based user model without a continuous network connection. Using an intermediary device can enable IoT devices to be installed in remote locations that have no or minimal network connectivity. Proactively notifying an intermediary device about an upcoming re-authorization enables the IoT device to be reauthorized before the expiration to enable continuous operation from one authorization period to the next.

The details of one or more implementations are set forth in the accompanying drawings and the description below. Other features will be apparent from the description and drawings.

DETAILED DESCRIPTION

Figure 1:
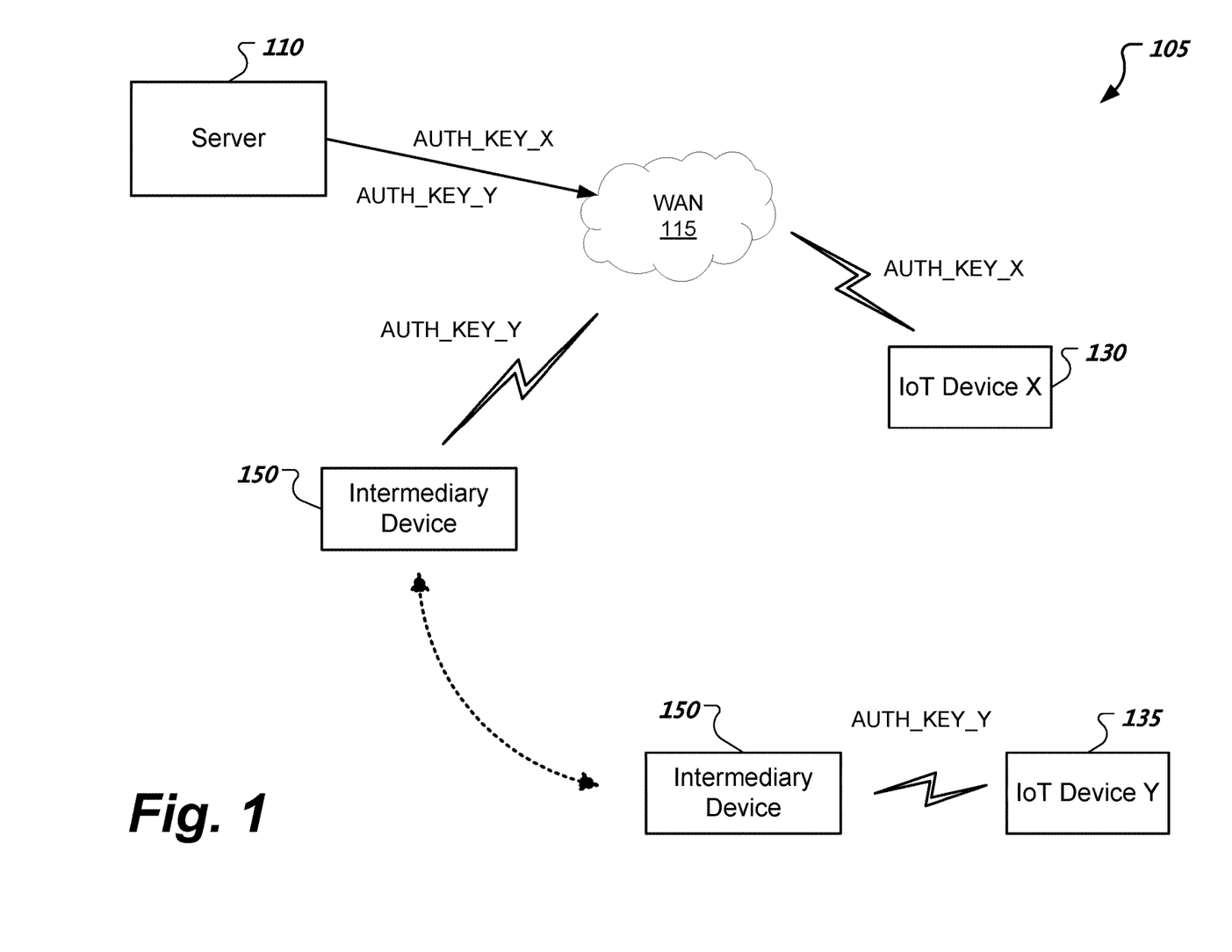
FIG. 1 shows an example of a system that performs service authorization for IoT devices.

FIG. 1 shows an example of a system 105 that performs service authorization for IoT devices 130, 135. The system 105 can include an authorization server 110, a network such as a wide area network (WAN) 115, IoT devices 130, 135, and intermediary device 150. In some implementations, the server 110 is a cloud server that includes two or more servers. The server 110 can include one or more processors and memories. The server 110 can include a network interface that couples with the network 115. In some implementations, the WAN 115 uses a wireless technology such as LTA, CDMA, or GSM. In some implementations, the WAN 115 is a WLAN. In some implementations, the IoT devices 130, 135 include a processor, memory, a network interface, sensor, controller, or a combination thereof. Various examples of sensors include video, audio, temperature, energy usage, motion, etc. A network interface can include a transceiver for wireline communications, wireless communications, or both.

The server 110 and the IoT devices 130, 135 can be configured to perform an authorization process. In some implementations, the IoT devices 130, 135 can perform an authorization process with the server 110 that is based on respective shared secret keys (labelled AUTH_KEY_X and AUTH_KEY_Y) via WAN 115. The authorization process can be performed during a setup procedure and at periodic intervals thereafter. If authorization is unsuccessful, then the IoT devices 130, 135 can enter or maintain a degraded-functionality mode. Upon successful authorization, the IoT devices 130, 135 can enter or maintain a full-functionality mode. In some implementations, the server 110 and the IoT devices 130, 135 perform public key exchanges to derive respective shared secret keys) during a setup procedure. In some implementations, each of the IoT devices 130, 135 store a shared secret key, and the server 110 stores the same for each device. In some implementations, the IoT devices 130, 135 are pre-provisioned with shared secret keys during manufacture or installation. In some implementations, an IoT device 130, 135 and the authorization server 110 can perform a public key exchange, such as a Diffie-Hellman key exchange, to establish a shared secret key. Other public key exchange techniques are possible.

In some implementations, the IoT device 135 communicates with the WAN 115 during an initial setup procedure. After the setup procedure, the IoT device 135 is placed in a remote location that is not within coverage of the WAN 115. Such a location can be a remote part of a property that benefits from surveillance, but typically has no or limited network connectivity. Further, the IoT device 135 may be attached to a fixture such as a pole or roof-top location. In this example, an intermediary device 150 such as a smartphone, wireless enabled laptop, or other types of wireless devices can be configured to act as an intermediary between the server 110 and the IoT device 135. In some implementations, an intermediary device 150 includes a processor, memory, one or more transceivers (e.g., a long-range transceiver, a short-range transceiver, or both), and a display.

In some implementations, each IoT device 130, 135 includes a timer (AUTH_TIMER) that is reset whenever the device is successfully reauthorized to operate. A timer can be implemented as a hardware timer, software timer, or a combined hardware and software timer. In some implementations, a timer can be realized via a count-down technique. In some implementations, a routine on an IoT device 130, 135 compares a current time with one or more expiration times of respective timers and calls a registered callback function when a timer expires or is within a predetermined period of time before expiration. The date and time when the AUTH_TIMER expires can be referred to as DEAUTH_DATETIME. If not reauthorized before DEAUTH_DATETIME, an IoT device 130, 135 can enter a degraded functionality mode where its primary user functionality is terminated but other functions such as authorization and data recording may continue. At a time before DEAUTH_DATETIME, the IoT device 130, 135 and the server 110 can attempt to reauthorize device operation. In some implementations, the server 110 initiates a reauthorization process. In some implementations, the IoT device 130, 135 initiates a reauthorization process. In some implementations, each IoT device 130, 135 can include multiple timers, where each timer can be configured to control an authorization of one or more functionalities that are operable by the IoT device 130, 135.

During a reauthorization process, the server 110 can send a hash based on a shared secret key and a timestamp to the IoT device 130. The IoT device 130 can check that the received hash matches a locally computed hash. If the hashes match, then the IoT device 120 resets its AUTH_TIMER and sends authorization status message to the server 110 to provide notification of a successful reauthorization. Based on receiving the status message, the server 110 can updates its expected de-authorization time for the IoT device 130.

Figure 2:
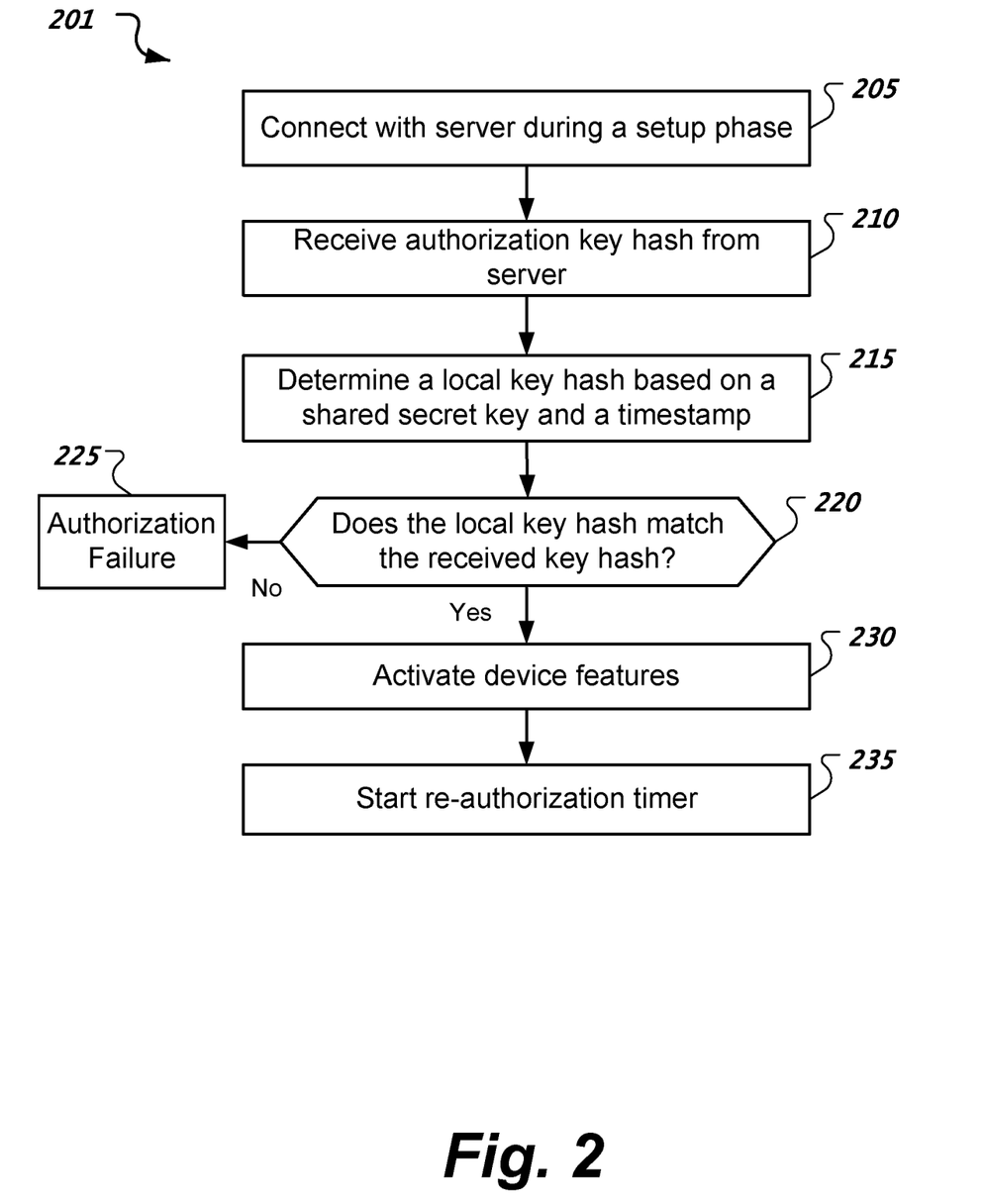
FIG. 2 shows a flowchart of an initial authorization process performed by an IoT device.

FIG. 2 shows a flowchart of an initial authorization process 201 performed by an IoT device, e.g., the IoT device 130 or the IoT device 135. At 205, the IoT device connects with a server, e.g., server 110, during a setup phase. In some implementations, the device and the server perform a public key exchange to determine a shared secret key. In some implementations, the device is configured with a shared secret key during a manufacturing process. At 210, the IoT device receives an authorization key hash from the server. In some implementations, the authorization key hash is computed based on a hash of a combination of the shared secret key and a timestamp value. For example, a sum of the shared secret key and the timestamp value can be used to compute a key hash. As another example, a difference of the shared secret key and the timestamp value can be used to compute a key hash. Other arithmetic or logical combinations, such as an XOR, between the shared secret key and the timestamp value can be used to compute the key hash. The use of a timestamp can help to avoid a replay attack, e.g., re-sending a previous authorization message to try to re-authorize the device without permission. In some implementations, the timestamp value has a high-level granularity to avoid time synchronization issues. For example, the timestamp can include a date value and an hour value which represents a particular hour within the day specified by the date value. At 215, the IoT device determines a local key hash based on a shared secret key and a timestamp. For example, the IoT device can compute a local key hash based on a combination of the shared secret key and a current timestamp value of the IoT device. At 220, the IoT device determines whether the local key hash matches the received key hash. If there is no match, then authorization is unsuccessful, and the IoT device generates an authorization failure notice (225). If there is a match, then authorization is successful, and the IoT device activates one or more device features (230). Activating a device feature can include enabling video capture, sensor data capture, etc. At 235, the IoT device starts a re-authorization timer. At or prior to the expiration of the timer, the IoT device can repeat the process (i.e., step 205), which at that time can be referred to as a reauthorization process. In some implementations, the one or more device features can be activated for a predetermined period of time that is controlled by a re-authorization timer.

In some implementations, the IoT device is configured to not renew the authorization if the authorization key hash does not match the local key hash. In some implementations, the IoT device is configured to deactivate one or more device features based on an expiration of the re-authorization timer occurring without a successful re-authorization. In some implementations, the IoT device is configured to place one or more device features in a degraded functionality mode based on an expiration of the authorization timer occurring without a successful re-authorization.

Figure 3:
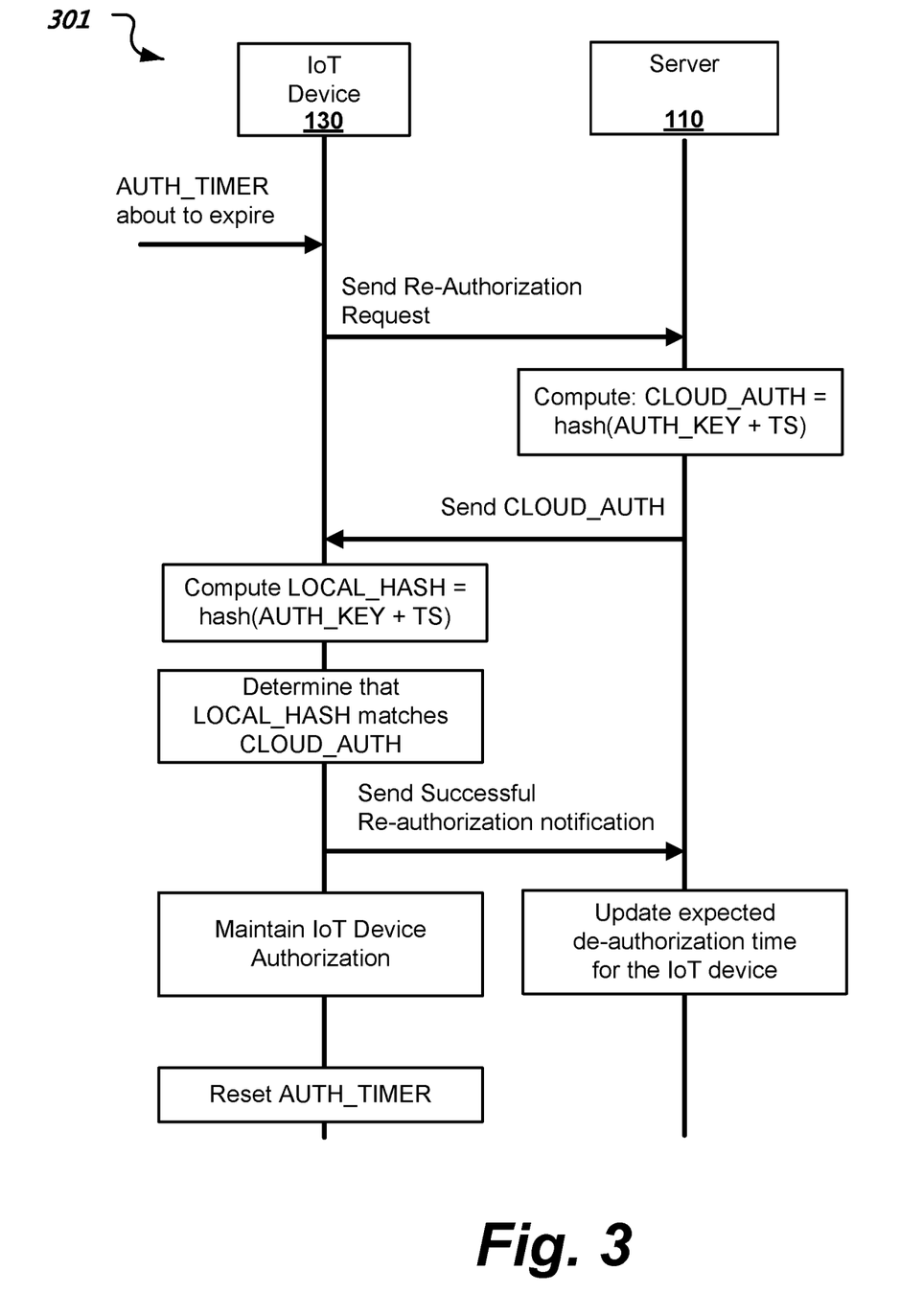
FIG. 3 shows an example of a sequence of events between an IoT device and a server of FIG. 1.

FIG. 3 shows an example of a sequence 301 of events between the IoT device 130 and the server 110 of FIG. 1. The IoT device 130 determines whether the re-authorization timer (labelled AUTH_TIMER) is about to expire (e.g., is there less than a predetermined amount of time such as one day or one hour remaining before expiration). If the timer is about to expire, the IoT device 130 sends a re-authorization request to the server 110 to renew an authorization. The server 110 computes an authorization key hash labelled CLOUD_AUTH, which can be expressed as CLOUD_AUTH=hash(AUTH_KEY+TS), where AUTH_KEY represents a shared secret key and TS represents the current timestamp. In some implementations, the current timestamp can be rounded to the nearest hour or the next hour. In some implementations, the current timestamp can be rounded to the nearest minute or the next minute. In some implementations, the hash function can be a cryptographic hash function such as a member of the Secure Hash Algorithm (SHA) family. Other types of hashes are possible. The server 110 sends an authorization message containing CLOUD_AUTH to the IoT device 130.

After receiving CLOUD_AUTH, the IoT device 130 computes a local hash, labelled LOCAL_HASH, which can be expressed as LOCAL_AUTH=hash(AUTH_KEY+TS), where AUTH_KEY represents a shared secret key and TS represents the current timestamp. The IoT device 130 determines that LOCAL_HASH matches CLOUD_AUTH, and sends a successful re-authorization notification to the server 110. Further, based on a successful match, the IoT device 130 maintains its authorization and continues to function as normal, and resets its re-authorization timer (AUTH_TIMER). The server 110, after receiving the notification, updates an expected de-authorization time for the IoT device 130. Note that if LOCAL_HASH does not match CLOUD_AUTH, the IoT device 130 can generate an authorization failure notification that may be displayed to a user of the IoT device 130 or sent to the server 110.

Figure 4:
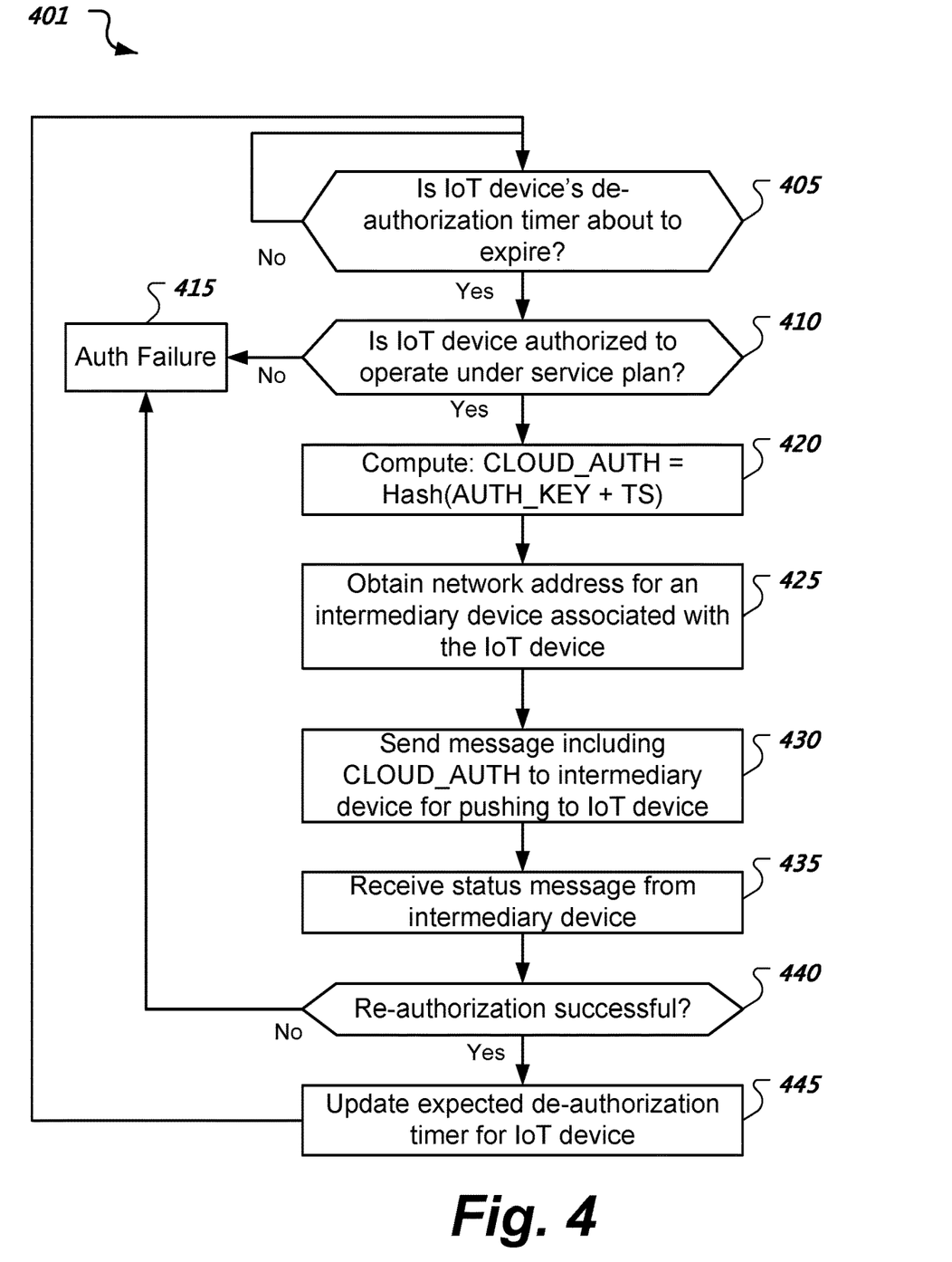
FIG. 4 shows a flowchart of an example of a process performed by a server that utilizes an intermediary device to reach an IoT device.

FIG. 4 shows a flowchart of an example of a process 401 performed by a server (e.g., server 110) that utilizes an intermediary device, such as device 150 of FIG. 1, to reach an IoT device. At 405, the server determines whether the IoT device's de-authorization timer is about to expire. In some implementations, the server accesses a customer device database to identify one or more customer devices that are about to expire. If the device is not expiring within a predetermined amount of time (e.g., 5 minutes, 4 hours, 1-2 days), the server checks again at a later time at 405. If the timer is about to expire, the server at 410 determines whether the IoT device is authorized to operate under a customer's service plan. In some implementations, the server can access a customer service plan database and determine whether a service plan associated with the device is in good standing, e.g., paid-up. If not paid-up or the IoT device is no longer included in the service plan, the server generates an authorization failure notification at 415.

If the device is included in the service plan, the server, at 420, computes CLOUD_AUTH=hash(AUTH_KEY+TS), where AUTH_KEY represents a shared secret key and TS represents the current timestamp. In some implementations, the server retrieves a shared secret key associated with the IoT device to compute CLOUD_AUTH. At 425, the server obtains a network address for an intermediary device associated with the IoT device. In some implementations, a mobile application can be installed on a customer's smart device, which in turns registers itself as an intermediary device with the server. At 430, the server sends a message including CLOUD_AUTH to the intermediary device for pushing to the IoT device. An example of operations performed by the intermediary device are depicted by FIG. 5.

At 435, the server receives a status message from the intermediary device. If the status indicates that re-authorization was unsuccessful, then the server, at 415, generates an authorization failure notification. If the status indicates that re-authorization was successful, then the server updates its expected de-authorization timer for the IoT device at 445 and proceeds to check the timer expiration at periodic intervals at 405.

Figure 5:
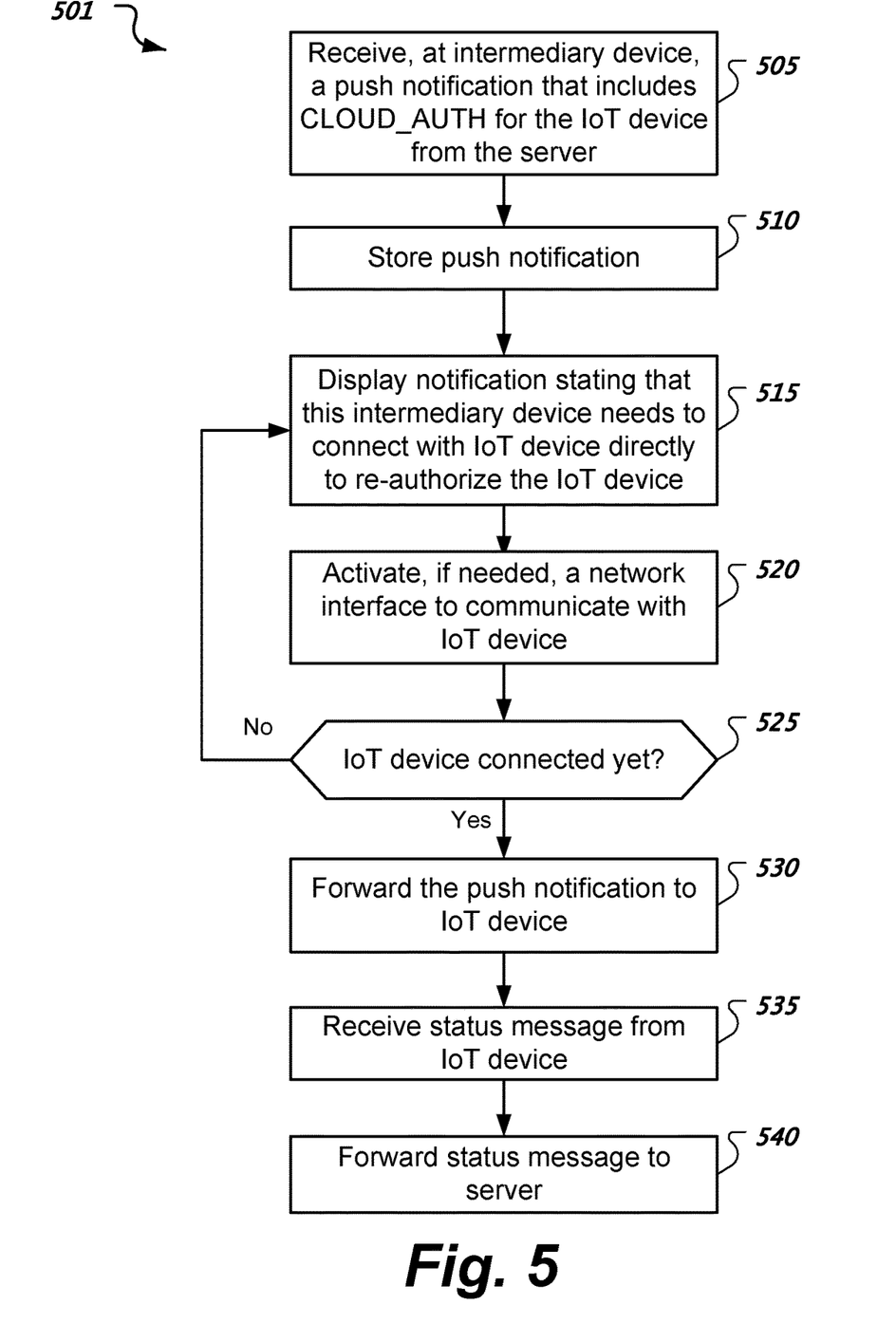
FIG. 5 shows a flowchart of an example of a process performed by an intermediary device in communication with a server and an IoT device.

FIG. 5 shows a flowchart of an example of a process 501 performed by an intermediary device in communication with a server and an IoT device. In some implementations, the intermediary device can be a smartphone or other wireless device that executes a mobile application for IoT device re-authorization. At 505, the intermediary device receives a message such as a push notification that includes CLOUD_AUTH for the IoT device from the server (e.g., message sent from the server at 430 of FIG. 4). At 510, the intermediary device stores the push notification in local storage. At 515, the intermediary device displays a notification stating that this intermediary device needs to connect with the IoT device directly to re-authorize the IoT device. In some implementations, the push notification includes device information such as a device identifier or a device identification string ("Tool shed camera"). In some implementations, displaying the notification can include displaying a device identification string included in the push notification or a picture of the device associated with a device identifier. In some implementations, displaying the notification can include displaying instructions such as "Please move this device within range of the IoT device."

At 520, the intermediary device activates, if needed, a network interface to communicate with IoT device. In some implementations, the intermediary device can activate a short-range connection such as a Wi-Fi direct connection or Bluetooth connection with the IoT device. In some implementations, the intermediary device can direct the user to perform manual steps to connect the intermediary device to the IoT device. This may involve manually connecting to a Wi-Fi or Bluetooth device. In some implementations, the intermediary device becomes physically connected with the IoT device via a cable such as a Universal Serial Bus (USB) cable. At 525, the intermediary device determines whether the IoT device is connected yet. If not connected, the intermediary device continues to display the notification at 515 or updates the display. If the IoT device is connected, then the intermediary device forwards the relevant data from the push notification to the IoT device at 530, specifically CLOUD_AUTH. The IoT device can perform an authorization process which can include computing a local hash and comparing the local hash with a hash included in the push notification as described above with respect to, for example, FIGS. 2 and 3.

At 535, the intermediary device receives a status message from the IoT device. The status message can include information about the next de-authorization time. In some implementations, the intermediary device causes the intermediary device to display a notification instructing the user to move back into range of a network connection that enables communication with the server. Additionally, the intermediary device may display instructions to regain access to the wide area network. At 540, the intermediary device forwards the status message to the server. In some implementations, forwarding the status message is based on a detection that the intermediary device is in range of a network connection that enables communication with the server.

Figure 6:
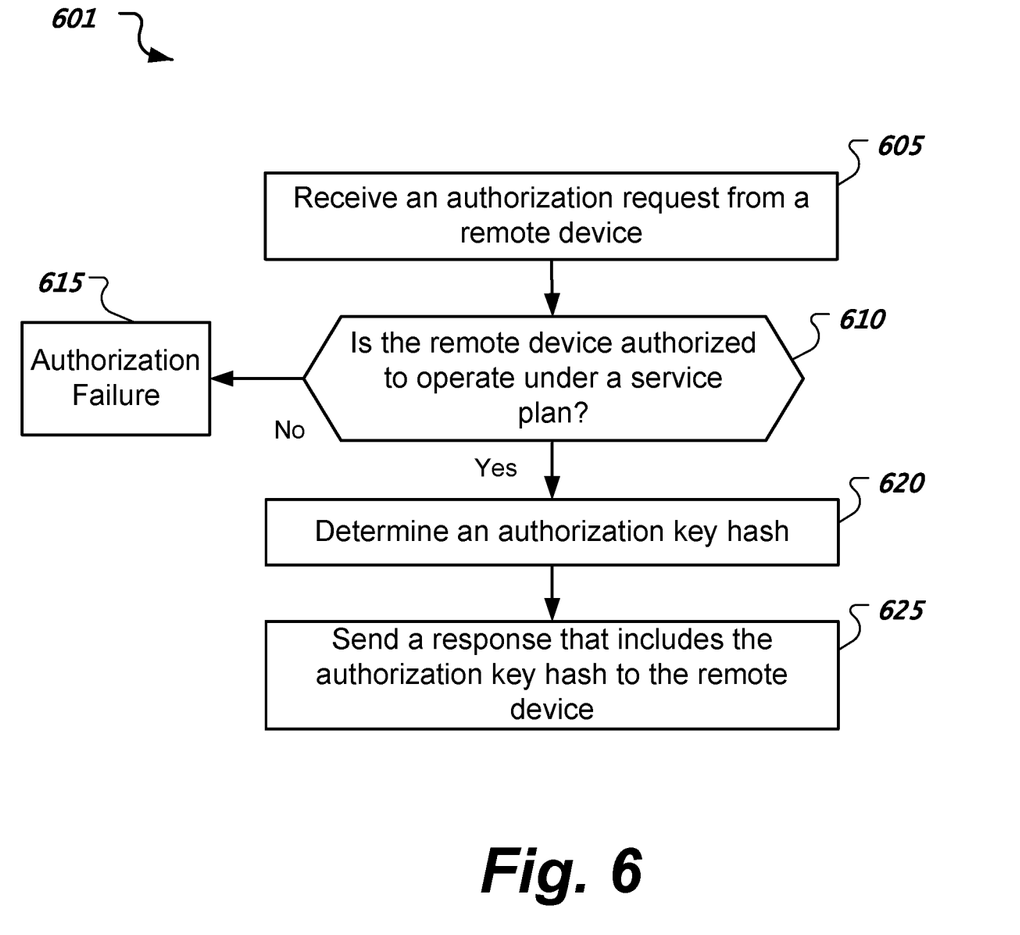
FIG. 6 shows a flowchart of an example of a process performed by a server to selectively authorize a remote device.

FIG. 6 shows a flowchart of an example of a process 601 performed by a server (e.g., server 110) to selectively authorize a remote device. At 605, the server receives an authorization request from a remote device. At 610, the server determines whether the remote device is authorized to operate under a service plan. In some implementations, the server queries a subscriber database based on a user identifier or device serial number contained in the authorization request. The subscriber database can include one or more subscriber records. A subscriber record can include a payment status, e.g., whether a user has paid for a service plan. The subscriber record can include one or more device serial numbers that are covered by the user's service plan. If the remote device is not authorized, then the server generates an authorization failure at 615. In some implementations, the authorization failure results in a failure status message being send to the remote device.

If the remote device is authorized, the server determines an authorization key hash at 620. In some implementations, the authorization key hash is based on a shared secret key and a server timestamp. In some implementations, the server accesses a current time to form the server timestamp. In some implementations, the shared secret key can be established between the remote device and the server in a communication exchange prior to receiving the authorization request. The server sends a response to the remote device at 625. The response includes the authorization key hash.

In some implementations, the server can receive an authorization status message from the remote device, and update an expected de-authorization time for the device in response to the authorization status message indicating a successful re-authorization. In some implementations, the server can determine that the expected de-authorization time is within a predetermined time period from a current time, e.g., 5-10 minutes, 1-5 hours, etc. If the expected de-authorization time is within such a time period, the server can determine whether the device remains authorized to operate under a service plan associated with the device, and if authorized, start a re-authorization process.

Figure 7:
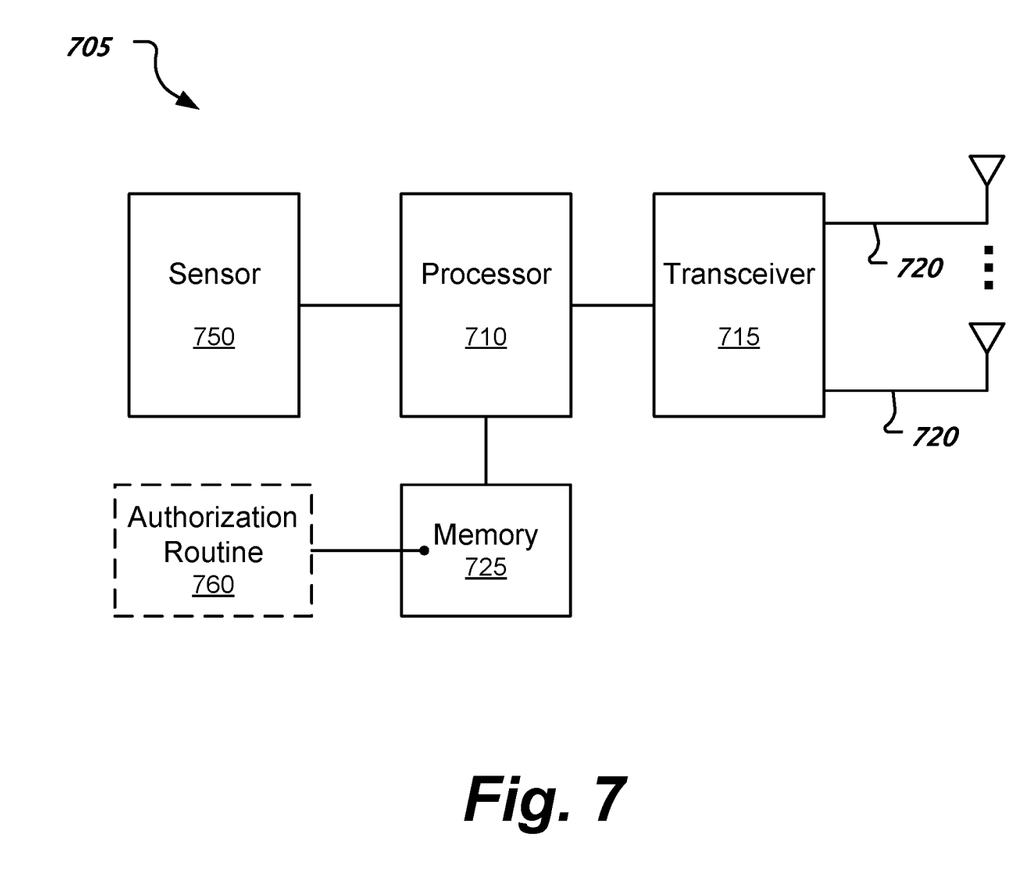
FIG. 7 shows a block diagram of an example of an IoT device.

FIG. 7 shows a block diagram of an example of an IoT device 705. The device 705 can implement methods effecting one or more techniques presented in this disclosure. The device 705 includes a transceiver 715 to send and receive wireless signals. In some implementations, the transceiver 715 includes a receiver and a transmitter. The transceiver 715 is coupled with one or more antennas 720. The device 705 further includes a processor 710, a memory 725, and a sensor 750. In some implementations, the processor 710 includes one or more processor cores. Various examples of a sensor 750 include video, audio, heat, and motion. Other types of sensors are possible.

The memory 725 can store information such as data, instructions, or both. In some implementations, the memory 725 can store instructions to cause the processor 710 to generate data for transmission and to process received data via the transceiver 715. In some implementations, the memory 725 can store instructions for an authorization routine 760 that activate one or more features of the device 705. For example, after performing a successful authorization, the authorization routine 760 can enable the device 705 to collect data from the sensor 750. In some implementations, the memory 725 can store a shared secret key for use in an authorization process.

In some implementations, the device 705 functions as a Streaming Video Recorder (SVR). For example, the sensor 750 can capture video and the device 705 can be configured to playback captured video via a display. In some implementations, the device 705 includes an HDMI (High-Definition Multimedia Interface) for playback of captured video on an external display. In some implementations, the authorization routine 760 can activate the device's video capture and playback features.

Figure 8:
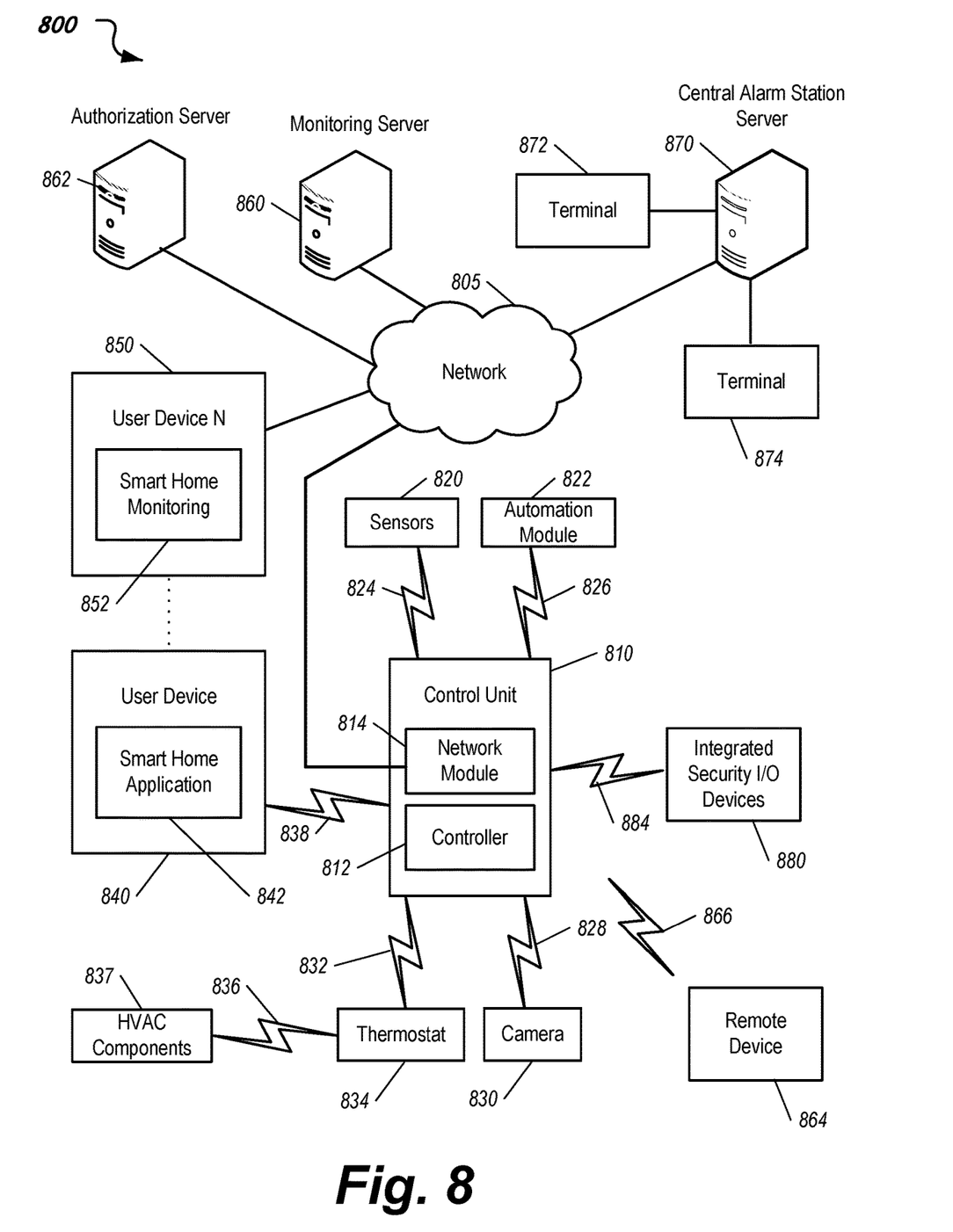
FIG. 8 shows a block diagram of an example of a security monitoring system.

FIG. 8 shows a block diagram of an example security monitoring system 800. The monitoring system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The system 800 includes an authorization server 862 that is connected to the network 805. The authorization server 862 can send authorization messages via the network 805 to various devices 864, 880, 830 to activate their functionality. A remote device 864 can have limited connectivity via a communication link 866 to the control unit 810. For example, the remote device 864 can be initially authorized via the communication link 866 to activate functionality, and then be placed in a remote location without the communication link 866. A user device 840 can act as an intermediary device to store and forward an authorization message from the authorization server 862, and deliver the message to the remote device 864 when in range.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 814 included in the control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the control unit 810 to communicate over a local area network and/or the Internet. The network module 814 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 820 may include a radio-frequency identification (RFID) sensor that identifies a particular article that includes a pre-assigned RFID tag.

The control unit 810 communicates with an automation module 822 and the camera 830 to perform monitoring. The module 822 is connected to one or more devices that enable home automation control. For instance, the module 822 may be connected to one or more lighting systems and may be configured to control operation of the one or more lighting systems. Also, the module 822 may be connected to one or more electronic locks at the property and may be configured to control operation of the one or more electronic locks (e.g., control Z-Wave locks using wireless communications in the Z-Wave protocol. Further, the module 822 may be connected to one or more appliances at the property and may be configured to control operation of the one or more appliances. The module 822 may include multiple modules that are each specific to the type of device being controlled in an automated manner. The module 822 may control the one or more devices based on commands received from the control unit 810. For instance, the module 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or within a residential facility 102-A monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the module 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller's 812 power supply if the camera 830 is co-located with the controller 812.

The system 800 also includes thermostat 834 to perform dynamic environmental control at the property. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a property and/or environmental data at a property, e.g., at various locations indoors and outdoors at the property. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834.

A HVAC module 837 is connected to one or more components of an HVAC system associated with a property, and is configured to control operation of the one or more components of the HVAC system. In some implementations, the module 837 is also configured to monitor energy consumption of the HVAC system components, for example, by directly measuring the energy consumption of the HVAC system components or by estimating the energy usage of the one or more HVAC system components based on detecting usage of components of the HVAC system. The module 837 can communicate energy monitoring information and the state of the HVAC system components to the thermostat 834 and can control the one or more components of the HVAC system based on commands received from the thermostat 834 via link 836.

The system 800 further includes one or more integrated security devices 880. The one or more integrated security devices may include any type of device used to provide alerts based on received sensor data. For instance, the one or more control units 810 may provide one or more alerts to the one or more integrated security input/output devices. Additionally, the one or more control units 810 may receive one or more sensor data from the sensors 820 and determine whether to provide an alert to the one or more integrated security input/output devices 880.

The sensors 820, the module 822, the camera 830, the thermostat 834, and the integrated security devices 880 communicate with the controller 812 over communication links 824, 826, 828, 832, 884, and 886. The communication links 824, 826, 828, 832, 884, and 886 may be a wired or wireless data pathway configured to transmit signals from the sensors 820, the module 822, the camera 830, the thermostat 834, and the integrated security devices 880 to the controller 812. The sensors 820, the module 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 884, and 886 may include a local network. The sensors 820, the module 822, the camera 830, the thermostat 834, and the integrated security devices 880, and the controller 812 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 8 (CAT5) or Category 8 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events (e.g., alarm events) generated by the control unit 810. In this example, the monitoring server 860 may exchange electronic communications with the network module 814 included in the control unit 810 to receive information regarding events (e.g., alerts) detected by the central alarm station server 870. The monitoring server 860 also may receive information regarding events (e.g., alerts) from the one or more user devices 840 and 850.

In some examples, the monitoring server 860 may route alert data received from the network module 814 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The central alarm station server 870 is an electronic device configured to provide alarm monitoring service by exchanging communications with the control unit 810, the one or more user devices 840 and 850, and the monitoring server 860 over the network 805. For example, the central alarm station server 870 may be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more user devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 8 illustrates two terminals for brevity, actual implementations may include more (and, perhaps, many more) terminals. The one or more user devices 840 and 850 are devices that host and display user interfaces. For instance, the user device 840 is a mobile device that hosts one or more native applications (e.g., the smart home application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Blackberry, Google Android, Windows Mobile, etc. The smart home application 842 enables the user device 840 to receive and process image and sensor data from the monitoring system.

The user device 850 may be a general-purpose computer (e.g., a desktop personal computer, a workstation, or a laptop computer) that is configured to communicate with the monitoring server 860 and/or the control unit 810 over the network 805. The user device 850 may be configured to display a smart home user interface 852 that is generated by the user device 850 or generated by the monitoring server 860. For example, the user device 850 may be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Zwave, ZigBee, HomePlug (Ethernet over powerline), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors 820 and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

In some implementations, the one or more user devices 840 and 850 are used in conjunction with only local sensors and/or local devices in a house. In these implementations, the system 800 only includes the one or more user devices 840 and 850, the sensors 820, the module 822, and the camera 830. The one or more user devices 840 and 850 receive data directly from the sensors 820, the module 822, and the camera 830, and send data directly to the sensors 820, the module 822, and the camera 830. The one or more user devices 840, 850 provide the appropriate interfaces/processing to provide visual surveillance and reporting. In some implementations, the system 800 provides end users with access to images captured by the camera 830 to aid in decision making. The system 800 may transmit the images captured by the camera 830 over a wireless WAN network to the user devices 840 and 850.

In some implementations, a state of the monitoring system and other events sensed by the monitoring system may be used to enable/disable video/image recording devices (e.g., the camera 830). In these implementations, the camera 830 may be set to capture images on a periodic basis when the alarm system is armed in an "Away" state, but set not to capture images when the alarm system is armed in a "Stay" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An apparatus comprising:
a transceiver configured to communicate with an authorization server; and
a processor coupled with the transceiver, wherein the processor is configured to obtain an authorization from the authorization server, and activate one or more features of the apparatus for a duration of a first predetermined time period in response to the authorization,
wherein the processor is configured to receive an authorization message from the authorization server, the authorization message comprising an authorization key hash that is based on a shared secret key and a server timestamp, determine a local key hash based on a shared secret key and a local timestamp, maintain an activation of the one or more features of the apparatus for a duration of a second predetermined time period based on the authorization key hash matching the local key hash, wherein the processor is configured to place the apparatus in a degraded functionality mode based on not receiving the authorization message during the duration of the first predetermined time period,
wherein the processor is configured to set an authorization timer for the first predetermined time period, and wherein the processor is configured to determine whether the authorization timer has expired and to place the one or more features of the apparatus in the degraded functionality mode based on an expiration of the authorization timer.

2. The apparatus of claim 1, wherein the processor is configured to send an authorization request to the authorization server to renew the authorization before an end of the first predetermined time period, and wherein the authorization message is sent in response to the authorization request.

3. The apparatus of claim 1, wherein the processor is configured to not renew the authorization based on a determination that the authorization key hash does not match the local key hash.

4. The apparatus of claim 1, wherein the processor is configured to deactivate one or more features of the apparatus based on the expiration of the authorization timer.

5. An apparatus comprising:
a transceiver configured to communicate with an authorization server; and
a processor coupled with the transceiver, wherein the processor is configured to obtain an authorization from the authorization server, and activate one or more features of the apparatus for a duration of a first predetermined time period in response to the authorization,
wherein the processor is configured to receive an authorization message from the authorization server, the authorization message comprising an authorization key hash that is based on a shared secret key and a server timestamp, determine a local key hash based on a shared secret key and a local timestamp, maintain an activation of the one or more features of the apparatus for a duration of a second predetermined time period based on the authorization key hash matching the local key hash, wherein the processor is configured to place the apparatus in a degraded functionality mode based on not receiving the authorization message during the duration of the first predetermined time period,
wherein the processor is configured to use the transceiver to establish a short-range connection with an intermediary device, and receive the authorization message from the authorization server via the intermediary device over the short-range connection.

6. The apparatus of claim 1, wherein the processor is configured to use the transceiver to establish a short-range connection with an intermediary device, wherein the processor is configured to send an authorization request to the authorization server via the intermediary device to renew the authorization before an end of the first predetermined time period, and wherein the authorization message is sent in response to the authorization request.

7. A system comprising:
a network interface configured to communicate with a device, wherein the device is configured to set an authorization timer, and wherein the device is configured to determine whether the authorization timer has expired and to place the one or more features of the device in a degraded functionality mode based on an expiration of the authorization timer; and
a processor coupled with the network interface, wherein the processor is configured to perform a first authorization process with the device, the first authorization process comprising receiving an authorization request from the device, determining whether the device is authorized to operate under a service plan, and sending a first authorization message that comprises a first authorization key hash based on the device being authorized to operate under the service plan, the first authorization key hash being based on a shared secret key and a first server timestamp, the shared secret key being established between the device and the system,
wherein the processor is configured to perform a second authorization process with the device before the expiration of the authorization timer in response to a determination that an expected de-authorization time is within a predetermined time period from a current time and a determination that the device remains authorized to operate under the service plan, the second authorization process comprising determining a second authorization key hash that is based on the shared secret key and a second server timestamp, and sending a second authorization message that comprises the second authorization key hash.

8. The system of claim 7, wherein the processor is configured to receive an authorization status message from the device, and update the expected de-authorization time for the device in response to the authorization status message.

9. A system comprising:
a network interface configured to communicate with a remote device; and
a processor coupled with the network interface, wherein the processor is configured to perform a first authorization process with the remote device, the first authorization process comprising receiving an authorization request from the remote device, determining whether the device is authorized to operate under a service plan, and sending a first authorization message that comprises a first authorization key hash based on the device being authorized to operate under the service plan, the first authorization key hash being based on a shared secret key and a first server timestamp, the shared secret key being established between the remote device and the system,
wherein the processor is configured to perform a second authorization process with the remote device in response to a determination that an expected de-authorization time is within a predetermined time period from a current time and a determination that the device remains authorized to operate under the service plan, the second authorization process comprising determining a second authorization key hash that is based on the shared secret key and a second server timestamp, and sending a second authorization message that comprises the second authorization key hash,
wherein the processor is configured to determine whether there is an intermediary device associated with the remote device, and wherein the processor is configured to send one or more messages to the intermediary device for forwarding to the remote device.

10. The system of claim 9, wherein the processor is configured to send a push notification to the intermediary device if the expected de-authorization time is within the predetermined time period from the current time, and wherein the push notification is configured to cause the intermediary device to display a notification stating that the intermediary device is required to establish a connection with the remote device to re-authorize the remote device.

11. The system of claim 9, wherein the processor is configured to receive an authorization status message from the device via the intermediary device, and update the expected de-authorization time for the device in response to the authorization status message.

12. The system of claim 7, wherein the processor is configured to exchange information with the device to establish the shared secret key.

13. A method comprising:
receiving, at an authorization server, an authorization request from a device, wherein the device is configured to set an authorization timer, and wherein the device is configured to determine whether the authorization timer has expired and to place the one or more features of the device in a degraded functionality mode based on an expiration of the authorization timer;
determining whether the device is authorized to operate under a service plan;
sending a first authorization message to the device based on the device being authorized to operate under the service plan, the first authorization message comprising a first authorization key hash, the first authorization key hash being based on a shared secret key and a first server timestamp, the shared secret key being established between the device and the authorization server;
determining whether the device remains authorized to operate under the service plan based on a determination that an expected de-authorization time is within a predetermined time period from a current time; and
sending, before the expiration of the authorization timer, a second authorization message to the device if the device remains authorized to operate under the service plan, the second authorization message comprising a second authorization key hash, the second authorization message based on the shared secret key and a second server timestamp.

14. The method of claim 13, wherein the device is a remote device, and wherein the method comprises:
determining whether there is an intermediary device associated with the remote device; and
sending the first authorization message to the intermediary device, the intermediary device being configured to establish a short-range connection with the remote device, and forward the first authorization message to the remote device via the short-range connection.

15. The method of claim 13, comprising:
receiving an authorization status message from the device; and
updating the expected de-authorization time for the device in response to the authorization status message.

16. A method comprising:
receiving, at an authorization server, an authorization request from a remote device;
determining whether the remote device is authorized to operate under a service plan;
sending a first authorization message to the remote device based on the device being authorized to operate under the service plan, the first authorization message comprising a first authorization key hash, the first authorization key hash being based on a shared secret key and a first server timestamp, the shared secret key being established between the remote device and the authorization server;
determining whether the remote device remains authorized to operate under the service plan based on a determination that an expected de-authorization time is within a predetermined time period from a current time;
sending a second authorization message to the remote device if the device remains authorized to operate under the service plan, the second authorization message comprising a second authorization key hash, the second authorization message based on the shared secret key and a second server timestamp;
determining whether there is an intermediary device associated with the remote device; and
communicating with the remote device via the intermediary device, the intermediary device being configured to establish a short-range connection with the remote device.

17. The method of claim 16, comprising:
receiving an authorization status message from the remote device via the intermediary device; and
updating the expected de-authorization time for the remote device in response to the authorization status message.

18. The method of claim 13, comprising:
exchanging information with the device to establish the shared secret key.

19. The method of claim 13, wherein the device is a remote device, and wherein the method comprises:
sending a push notification to an intermediary device, wherein the push notification is configured to cause the intermediary device to display a notification stating that the intermediary device is required to establish a connection with the remote device to re-authorize the remote device.

\* \* \* \* \*